United States Patent Office 2,699,342
Patented Jan. 11, 1955

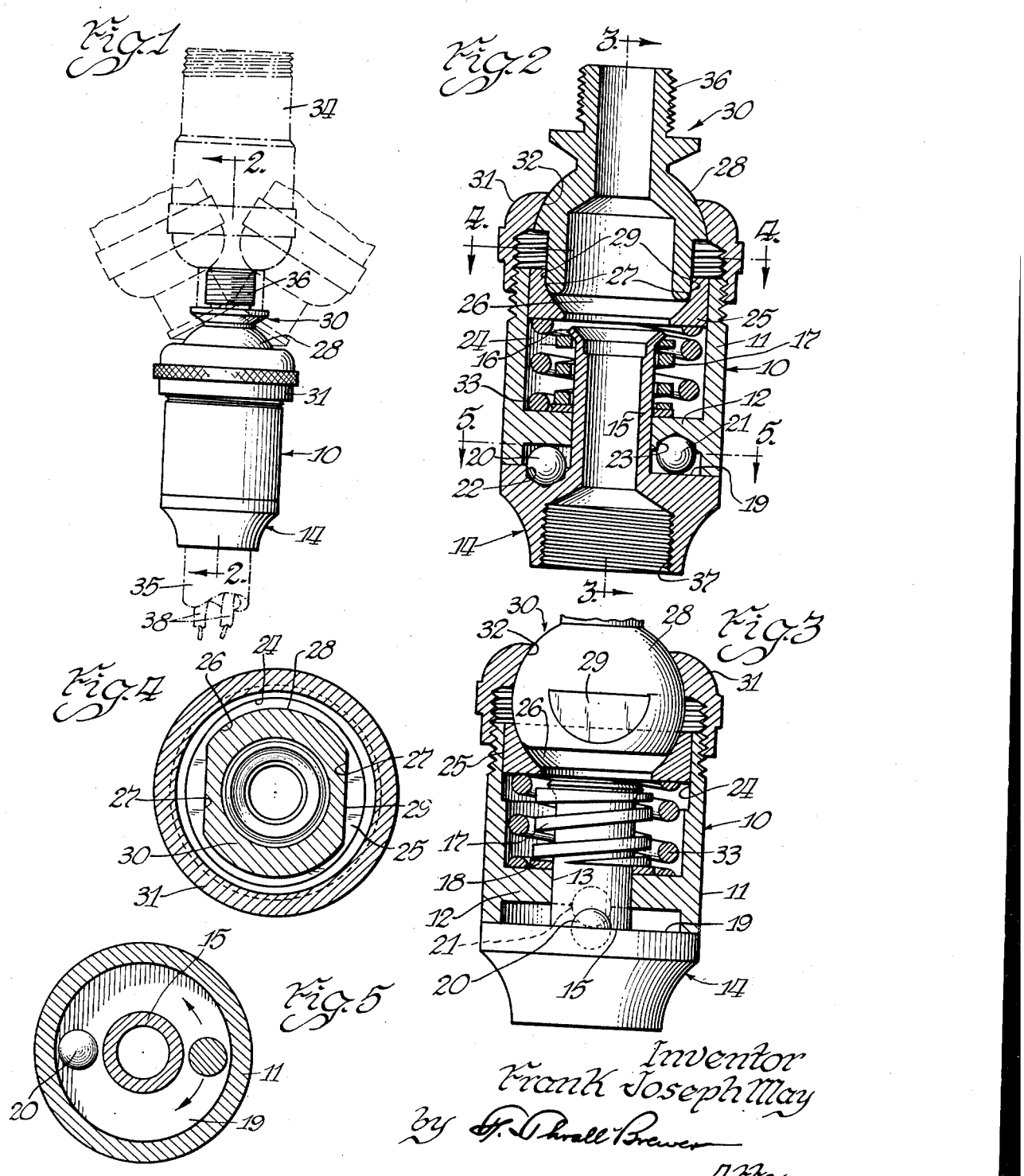
Jan. 11, 1955 — F. J. MAY — 2,699,342
SPRING PRESSED PIVOTED FIXTURE JOINT
Filed April 10, 1952
Inventor
Frank Joseph May

2,699,342

SPRING PRESSED PIVOTED FIXTURE JOINT

Frank J. May, McHenry, Ill., assignor to Rembrandt Lamp Corporation, Chicago, Ill., a corporation of Illinois Application April 10, 1952, Serial No. 281,583

1 Claim. (Cl. 285—91)

My invention relates to a fixture joint, and more particularly to a compound joint adapted to use with parts carrying electrical conductors and which is capable of limited movements in transverse planes.

An object of this invention is to provide a compound joint capable of resisted swiveling movements suited to the mounting of a fixture or the like and wherein relative movements of parts are limited to prevent electrical conductors carried thereby from being excessively twisted or flexed. In view of these requirements it is desirable to construct the joint in two sections, one of which permits limited rotation of the fixture about one axis, and the other of which permits tilting with respect to the plane of rotation. Through the disclosed invention, I have provided a compact structure in which the aforesaid two sections are closely associated in a small space and are provided with suitable resilient accessories giving desirable functional resistance to movements between the parts of the sections.

Another object is the provision of an improved joint of the ball-and-socket type which is adapted to give angular tilting movement about a certain axis. This type of joint is ideally suited to be one of the sections of the aforesaid compound joint.

As another object of the invention, I have provided a compound joint structure wherein the parts are ruggedly constructed for wear resistance, while affording features of economy, including ease of production, assembly and disassembly.

Other objects and advantages of the invention will be apparent from the following description and the accompanying drawings in which similar characters of reference indicate similar parts throughout the several views.

Referring to the single sheet of drawings:

Fig. 1 is a side elevational view, partly in section, of a fixture joint embodying preferred structural features of my invention, and shows adjusted positions of movable parts of the structure in dotted lines;

Fig. 2 is a vertical sectional view, taken substantially on a line 2—2 of Fig. 1 and in the direction of the arrows;

Fig. 3 is a vertical sectional view, with certain parts in elevation, taken substantially on a line 3—3 of Fig. 1, and viewed in the direction of the arrows;

Fig. 4 is a horizontal sectional view taken substantially on a line 4—4 of Fig. 2 and in the direction of the arrows; and Fig. 5 is a horizontal sectional view taken substantially on a line 5—5 of Fig. 2 and in the direction of the arrows.

With reference to the drawings, wherein a preferred embodiment of the invention is shown for illustrative purposes, a hollow intermediate member 10 has a cylindrical outer wall 11 and a radial inner flange or wall 12 which extends inwardly from the outer wall 11 near one end and has an opening 13 therein. A hollow end member 14 has an axially projecting cylindrical portion 15 extending through and having a rotational fit in the opening 13 of the radial wall 11 and into the intermediate member 10. The end of the cylindrical portion is internally reduced in sectional thickness and is flared outwardly as indicated at 16 in Fig. 2, so as to retain a spring 17 which presses against a washer 18 resting on the radial wall 12 to hold a shoulder surface 19 of the end member 14 in tight engagement with the end of the cylindrical outer wall 11 of the intermediate member 10.

The cylindrical wall 11 of the intermediate member 10 projects axially beyond the radial wall 12 and engages the shoulder surface 19 on the end member 14 to space the shoulder from the radial wall. The shoulder and the transverse wall, respectively, have projections 20 and 21 which, in the embodiment shown, take the form of ball inserts. The inserts are mounted in recesses 22 and 23 in the shoulder and transverse wall and project therefrom. The space between the shoulder surface 19 and the radial wall 12 is determined to prevent the ball inserts from escaping from their respective recesses. When the intermediate member 10 and the end member 14 are relatively rotated, the projections or inserts 20 and 21 engage one another and restrict the aforesaid members to a relative rotation of slightly less than one revolution. The coil spring 17, acting between the flared end 16 of the reduced portion 15 of the end member 14 and the radial wall 12 of the intermediate member 10, urges the end of the cylindrical wall 11 against the shoulder 19 to provide frictional engagement therebetween which resists relative rotation between those members.

The interior surface of the end of the cylindrical wall 11 away from the radial wall 12 and end member 14 is non-circular; more specifically, in the disclosed embodiment, it is elliptical, as indicated at 24 in Fig. 4. This interior surface portion 24 receives a seating ring 25 which has an elliptical exterior surface fitting the interior surface portion 24. This fitting elliptical shape of the parts permits the seating ring to move axially with respect to the intermediate member 10, but prevents relative rotational movement between those parts. The seating ring 25 has an interior concave and partially spherical surface 26 with two opposed parallel flat surfaces 27, which are respectively engaged by a spherical surface 28 and two opposed parallel flat surfaces 29 formed on a hollow end member 30. This end member is held in its assembled relationship with respect to the seating ring 25 and the seating ring is held in place relative to the intermediate member 10 by a retainer ring 31 which has threaded engagement with the end of the exterior of the cylindrical wall 11 of the intermediate member. The retainer ring has an interior concave spherical surface 32 engaging the spherical surface 28 of the end member 30.

Because of the spherical surface 28, the end member 30 may be considered to be a ball member and to have a ball-and-socket connection of a certain type with the intermediate member 10 through the seating ring 25 and the retainer 31, which ball-and-socket connection is restricted to movement in one plane by the flat surfaces 29.

A coil spring 33, which surrounds the spring 17 and lies within the cylindrical wall 11 of the intermediate member 10, acts between the radial wall 12 and the seating ring 25 to urge the latter against the end member 30 and this member in turn against the retainer 31. Thus, there is friction between these parts, which resists the movements of the end member 30. Such movements are angular with respect to the seating ring about an axis that is perpendicular to the flat surfaces 27 and 29 and to the axis of relative rotation between the members 10 and 14.

Since the seating ring 25 is fixed axially of the intermediate member 10 in any given position of the retainer with respect to the intermediate member, the aforementioned angular movement between the end member 30 and the seating ring 25 also occurs between the end member 30 and the intermediate member 10. The spring 33 keeps the seating ring 25 in engagement with the end member 30, so that the desired angular movement of the end member is possible and provides for adjustment of the frictional resistance to such angular movement through adjustment of the retainer 31 with respect to the intermediate member 10.

The compound joint described may be used, for example, to provide universal mounting of a lamp socket 34 on a tubular support 35. The socket 34 and the support 35 are illustrated in Figs. 1 and 2 as connected with the end members 30 and 14, respectively, through an external thread 36 on the end member 30 and an internal thread 37 on the end member 14. Conductors 38 (Fig. 1) extend through the support 35 and the members of the compound joint to the lamp socket 34. Since the relative rotation of the intermediate member 10 and the end member 14 is limited by the ball inserts 20 and 21 to less than one revolution, the conductors 38 will not be twisted sufficiently to be broken. Since the members 10 and 14 may move relatively about one axis and the members 14 and 30 about another axis perpendicular to the one axis, there is in effect universal movement between the members 14 and 30 or between the parts connected to these members, such as the lamp socket 34 and the tubular support 35.

The arrangement of the springs 17 and 33 one within the other provides good compact construction by keeping down its overall length.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

A compound joint comprising a hollow intermediate member having a wall adjacent one end thereof, a hollow end member having a shoulder and a reduced portion projecting from the shoulder through the said wall into the intermediate member whereby the intermediate and first end members have relative rotational movement about an axis extending in the direction of the reduced portion by virtue of engagement between the reduced portion and the wall and between the shoulder and the said one end of the intermediate member, a first spring surrounding the reduced portion and acting between the end thereof and the wall to provide frictional resistance to the aforesaid rotational movement, a seat ring mounted in the end of the intermediate member away from the wall so as to be capable of movement with respect to the intermediate member along said axis and prevented from movement with respect to the intermediate member about said axis, said seat ring having a concave spherical surface, a second hollow end member having a spherical surface engageable with the concave spherical surface of the seat ring, the ring and second end member also having flat surfaces engageable with one another for limiting relative movement between the ring and the second end member to rotation about an axis transverse to the aforesaid axis, a retainer connected with the intermediate member for holding the second end member on the seat ring, and a second spring surrounding the first spring and acting between the seat ring and the said wall of the intermediate member to urge the seat ring against the second end member, thereby to provide frictional resistance to the movement therebetween, the end of the reduced portion of the first end member being flared to engage the end of the first spring, whereby the intermediate and first end members are retained in assembled relation, the seat ring having an elliptical exterior engaging an elliptical interior at the end of the intermediate member away from the wall, whereby the ring is capable of movement with respect to the intermediate member in the direction of the first mentioned axis and is prevented from having movement with respect to the intermediate member about the first mentioned axis as aforesaid.

References Cited in the file of this patent

UNITED STATES PATENTS

| Number | Name | Date |
|---|---|---|
| 1,285,291 | McLaughlin | Nov. 19, 1918 |
| 2,362,100 | Schwartz | Nov. 7, 1944 |
| 2,460,880 | Geizer et al. | Feb. 8, 1949 |